June 26, 1934.  V. S. FAAST  1,964,255
SPRAY GUN
Filed July 13, 1932
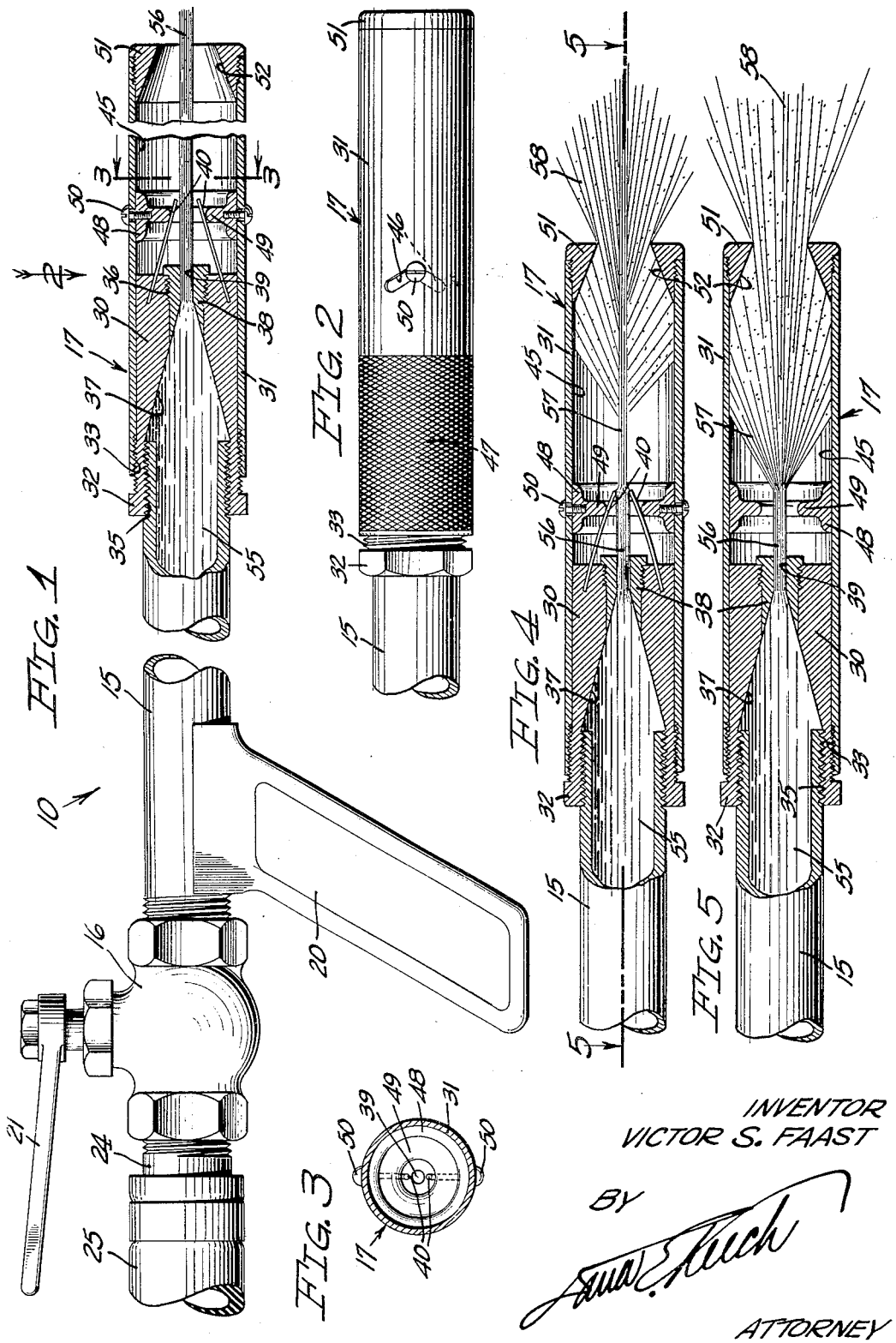
INVENTOR
VICTOR S. FAAST
BY
ATTORNEY Patented June 26, 1934

1,964,255

UNITED STATES PATENT OFFICE 1,964,255

SPRAY GUN

Victor S. Faast, Los Angeles, Calif.

Application July 13, 1932, Serial No. 622,220

7 Claims. (Cl. 299—122)

My invention relates to spray guns, particularly to the classes of guns which are used extensively for spraying insecticide solutions onto trees and the like.

Proper care of trees, plants, and practically every form of plant life necessitates almost constant warfare against the many kinds of insects which prey upon plant life. One method which is used very extensively for controlling tree and fruit destroying insects is the spraying of such trees with various insecticides. In this method a portable tank and pumping unit is provided and the solution is pumped into a suitable hose at high pressure and sprayed over the trees by means of a spray gun. In the spraying of trees, particularly tall trees, the spraying solution is pumped at pressures which often range as high as 750 lbs., and the guns from which the solutions are sprayed must be provided with suitable nozzles which will atomize the insecticides in a manner to prevent injury to the trees which might result from the high velocity of the solution. Many spray guns of this type which are in use at present are provided with nozzles which are adapted to convert a solid stream of solution into a spray, but in accomplishing this object the present guns often greatly reduce the velocity of the solution and the effectiveness and range of the spray which is discharged from the gun.

It will also be found that many of the spray guns in present use are provided with spreaders which convert a solid stream of solution into a flat fan-shaped spray which has thin feather edges and thick and thin spots in the stream causing uneven coverage and waste of material.

It is an object of my invention to provide an insecticide spray gun which will thoroughly atomize a solid stream of solution without greatly reducing the velocity of the solution.

Another object of my invention is the provision of a spray gun which will, in addition to atomizing a solid stream of solution, concentrate the spray so that a well defined, high velocity spray is discharged from the gun.

A further object of my invention is to provide a spray gun which is easily and quickly adjustable to meet the demands of various kinds of spraying operations.

Further objects and advantages will become evident in the following description taken in connection with the accompanying drawing, in which:

Fig. 1 is a side elevational view of a preferred embodiment of my invention, certain portions thereof being shown in section.

Fig. 2 is a fragmentary plan view taken in the direction of the arrow 2 of Fig. 1.

Fig. 3 is a cross-sectional view taken on the line 3—3 of Fig. 1.

Fig. 4 is a sectional view illustrating the operation of a portion of the apparatus shown in Fig. 1.

Fig. 5 is a longitudinal sectional view taken on the line 5—5 of Fig. 4.

Referring particularly to the drawing, a spray gun 10, comprising a preferred embodiment of my invention, is shown in Fig. 1, this gun including a tubular body 15, a control valve 16, and a nozzle 17.

The tube 15 is preferably made of standard high pressure pipe screw-threaded at opposite ends thereof and provided with a suitable handle 20. A portion of the tube 15 is broken away in the drawing, but in actual practice this member would preferably be from two to six feet in length.

The valve 16 is secured to one end of the tube 15, as shown, this valve being of conventional high pressure design and adapted to be manually operated by means of a lever 21. Screwed into the valve 16 opposite the tube 15 is a short nipple 24 to which a high pressure hose 25 is clamped as shown, it being understood that any one of several types of couplings might be used to join the hose 25 to the valve 16.

The nozzle 17 is removably secured to the end of the tube 15 opposite the valve 16, this nozzle including a hollow annular body 30 and a tubular outer shell 31. The body 30 has a hexagonal portion 32 to facilitate mounting the nozzle 17 on or removing it from the tube 15. Formed on the body 30 adjacent the hexagonal portion 32 are external threads 33 as shown. The bore of the body 30 is formed to provide large and small internally threaded openings 35 and 36 and a frusto-conical chamber 37, the latter being disposed between the openings 35 and 36. The threaded opening 35 is adapted to receive one end of the tube 15, and the small threaded opening 36 is adapted to receive a plug 38, the latter having a central orifice 39 therein, it being noted that a portion of the plug 38 is taper-bored to form a continuation of the chamber 37 as shown.

Driven into suitable holes provided in the forward end of the body 30 is a pair of converging wires 40, the free ends of which terminate, normally, as shown in Fig. 1. The wires 40 are preferably made of a non-corrosive metal of high tensile strength, such as spring phosphor-bronze, or the like.

The shell 31 is internally threaded at opposite ends thereof and adapted to be removably mounted on the body 30, as shown, this shell extending beyond the body 30 to provide a cylindrical chamber 45. Cut through the wall of the shell 31, as shown in Fig. 2, is a pair of diametrically opposed helical slots 46. As shown in Fig. 2, a portion of the outside of the shell 31 is knurled as indicated at 47. Rotatably positioned within the chamber 45 of the shell 31 is a ring 48 having an internal annular flange 49 formed integral therewith. The ring 48 is secured within the shell 31 by means of screws 50 which pass through the slots 46 into the ring 48 as shown, it being noted that the flange 49 of the ring 48 contacts the free ends of the wires 40. Threaded into the open end of the shell 31 is a spray collecting sleeve 51 which is taper-bored as shown.

*Operation*

The spray gun 10 of my invention is adapted to be operated in the following manner: The hose 25 is coupled to a suitable pumping unit (not shown), the valve 16 is opened, and a spraying solution 55 is pumped at high pressure into the hose 25. The solution fills the tube 15 and is forced through the orifice 39 of the plug 38 to form a solid high velocity stream 56. When tall trees are to be sprayed, the shell 31 is unscrewed relative to the body 30 to the position shown in Figs. 1 and 2, it being noted in Fig. 1 that the wires 40 are out of contact with the solid stream 56 of solution 55 and that the stream 56 passes undisturbed through the spray collecting sleeve 51 and out of the nozzle 17. When an atomized spray is desired the operator of the gun 10 grasps the knurled portion of the sleeve 31 and screws the latter further onto the body 30. It is clear that as the sleeve is screwed onto the body 30 the flange 49 of the ring 48 bears against the wires 40, causing the latter to deflect toward each other, thus bringing the free ends of the wires into contact with the solid stream 56 of solution. Contact of the stream 56 of solution 55 by the wires 40 causes the solid stream to flare into a flat fan-shaped spray 57 within the chamber 45, as shown in Figs. 4 and 5. The side portions of the spray 57 strike against the inner surface of the chamber 45 forming a dense fog of solution within this chamber. The atomized solution passes from the chamber 45 through the slightly restricted spray collecting sleeve 51 and a resultant cone of spray 58 is ejected from the nozzle 17 at a high velocity.

In addition to adjusting the nozzle by rotating the shell 31 relative to the body 30, a further range of adjustment can be had by rotating the ring 48 within the shell 31. This is accomplished by loosening the screws 50 and rotating the ring 48 by gripping the heads of the screws 50. As the ring 48 rotates, the helical slots 46 in the shell 31 contact the screws 50 causing the ring 48 to slide within the shell 31. After being adjusted as desired, the ring 48 is again secured within the shell 31 by tightening the screws 50.

If desirable, the plug 38 can be replaced by plugs (not shown) to provide different sized orifices than the orifice 39 of the plug 38. The plug 38 is replaced by removing the shell 31 from the body 30.

It is seen that the apparatus of my invention is easily adaptable to meet many different spraying requirements, and it is also seen that when the nozzle 17 is adjusted as shown in Fig. 1 the spray gun 10 might be used very effectively for fire fighting purposes, in forestry work and the like, by supplying water in place of the insecticide solution 55.

It is to be noted that the angle which the surface 52 makes with the axis of the liquid stream 56 is substantially less than the angle made by the spray 57 with this axis as shown in Fig. 5. The tendency is for the surface 52 to reassemble the particles of spray 57 and form these into a cone of spray 58 having a substantially smaller angle of dispersion than that of the spray 57. The term "angle of dispersion" is intended to refer to the maximum angle of the paths which the particles of spray travel along with relation to the axis of the stream 56.

I claim as my invention:

1. In a spray gun, the combination of: a tube; a cylindrical nozzle body mounted on the discharge end of said tube, said body having an orifice provided axially therein for forming a jet; a cylindrical shell rotatably and threadedly mounted on the exterior of said body; a plurality of jet breaking members mounted on said body within said shell symmetrically relative to said jet; means on said shell for engaging said members by virtue of longitudinal movement of said shell when said shell is rotated on said body to symmetrically move said members inward into position to engage said jet; means for adjusting said last mentioned means longitudinally on said shell; and a spray restricting ring provided in the discharge end of said shell.

2. In a spray gun, the combination of: a tube; a cylindrical nozzle body mounted on the discharge end of said tube, said body having an orifice provided axially therein for forming a jet; a cylindrical shell rotatably and threadedly mounted on the exterior of said body; a plurality of jet breaking members formed of spring metal and firmly mounted on said body within said shell symmetrically relative to said jet; means on said shell for engaging said members by virtue of longitudinal movement of said shell when said shell is rotated on said body to symmetrically spring said members inward into position to engage said jet; means for adjusting said last mentioned means longitudinally on said shell; and a spray restricting ring provided in the discharge end of said shell.

3. In a spray gun, the combination of: a tube; a cylindrical nozzle body mounted on the discharge end of said tube, said body having an orifice provided axially therein for forming a jet; a cylindrical shell rotatably mounted on the exterior of said body; a plurality of jet breaking members mounted on said body within said shell symmetrically relative to said jet, the free ends of said members extending in the same direction with and toward said jet at an acute angle therewith; and means on said shell for engaging said members when said shell is rotated on said body to symmetrically move said members inward into position to engage said jet.

4. In a spray gun, the combination of: a tube; a cylindrical nozzle body mounted on the discharge end of said tube, said body having an orifice provided axially therein for forming a jet; a cylindrical shell rotatably mounted on the exterior of said body; a plurality of jet breaking members formed of spring metal and mounted on said body within said shell symmetrically relative to said jet, the free ends of said members extending in the same direction with and toward said jet at an acute angle therewith; and means on said shell for engaging said members when said shell is rotated on said body to symmetrically spring said members inward into position to engage said jet.

5. In an insecticide gun for forming and throwing a cone of spray at a relatively high velocity, the combination of: means forming a relatively small, high velocity, compact stream of liquid; interfering means extending into contact with said stream and breaking said stream into a fan-like spray having a relatively wide angle of dispersion; and means providing a chamber in alignment axially with said stream and disposed to receive, confine and shape said spray, said chamber having a constricting, internal conoidal surface positioned in the path of said spray and coaxially relative to said stream to reassemble and discharge the particles of said spray in a cone having a smaller angle of dispersion than said spray.

6. A combination as in claim 5 in which said chamber includes an internal cylindrical surface of greater length than its diameter and disposed between the point at which said interfering means contacts said stream and said conoidal surface.

7. A combination as in claim 5 in which said interfering means comprises a plurality of members symmetrically disposed about said stream of liquid and extending into contact with said stream at an acute angle with said stream so that the force of said stream tends to move said members outwardly therefrom.

VICTOR S. FAAST.